United States Patent Office 3,763,239
Patented Oct. 2, 1973

3,763,239
PURIFICATION OF SECONDARY ALKYL
PRIMARY MONOAMINES
William Smolin, Wappingers Falls, N.Y., assignor to
Texaco Inc., New York, N.Y.
No Drawing. Filed Feb. 9, 1971, Ser. No. 114,057
Int. Cl. C07c *85/10, 85/16*
U.S. Cl. 260—583 N                                 4 Claims

ABSTRACT OF THE DISCLOSURE

A process for purifying secondary alkyl primary monoamines by extracting the diamine impurities therefrom which comprises contacting the mono- and diamine mix with aqueous mineral acid containing, if desired, a dissolved inorganic salt having the identical anion as the mineral acid, thereby forming a substantially diamine-free organic amine phase and an aqueous phase; separating said phases; neutralizing said phases to isolate a substantially pure monoamine product, recovering said monoamine product as well as a substantially pure diamine concentrate.

BACKGROUND OF THE INVENTION

In the preparation of secondary alkyl primary amines by the process which comprises nitration of normal paraffins followed by hydrogenation of the nitroparaffins, certain diamine by-products are formed as a result of dinitration in the initial process step. The formation of such difunctional amines occurs more readily as the paraffin chain length increases. Attempts to remove the diamine impurities have concentrated on vacuum distillation of the amine products. Such attempts have been generally unsuccessful inasmuch as the boiling points of monoamines and diamines containing two less carbon atoms in the paraffin chain are comparatively similar. Accordingly, separation by distillation has not been effective for amine products derived from n-paraffin stocks having a spread of three or more carbon units.

SUMMARY OF THE INVENTION

The primary object of this invention is to provide an efficient process for the separation of sec-alkyl primary mono- and diamines.

It is a further object to provide a separation procedure which can be effectively used for amine mixtures derived from n-paraffin stocks having a spread of three or more carbon units.

Various other objects and advantages of this invention will be apparent from the following detailed description thereof.

Thus, the separation of diamines from monoamine products has now been accomplished on the basis of differences in the distribution of their respective acid salts between a water phase and a suitable organic solvent phase such as free amines. Inasmuch as the diamine salt is more soluble in the aqueous phase and, correspondingly, the presence of excess free anion decreases the solubility of the monoamine salt in the aqueous phase and pushes it into the organic amine phase, a scheme is presented for the quantitative separation of these products. Furthermore, contrary to the prior art processes, the instant process is effective for amine products derived from n-paraffin stocks having a spread of three or more carbon units.

DESCRIPTION OF THE PREFERRED EMBODIMENTS

The novel separation procedure of this invention proceeds by contacting the amine product, including both mono- and diamine impurities, subsequent to removal of non-amine impurities, with an aqueous mineral acid such as hydrochloric, sulfuric or phosphoric acid until the diamine impurities are removed. The subsequent amine salt formation and subsequent extraction of the monoamine product may be conducted by any number of applicable extraction techniques such, for example, as multiple batch extraction or continuous counter current extraction, at temperatures ranging from about 50° to 300° F., and preferably at ambient temperatures. The amount of mineral acid sufficient to extract the diamine impurities from the amine product will generally range from 0.01 to 1.0 equivalent of acid per equivalent of total mono- and diamine present; preferably from 0.05 to 0.5 equivalent of acid per equivalent of total amine. The aqueous acid should be dilute, preferably below about 10 weight percent acid content.

It should be noted that the extraction procedure can be further improved by dissolving in the extracting aqueous acid from about 0 to 10% by weight, of at least one inorganic salt containing the identical anion as the mineral acid, e.g., chlorides in hydrochloric acid and sulfates in sulfuric acid. Generally, the alkali metal salts will be most effective.

As a result, from this extraction procedure an organic amine phase containing the monoamine salt material and an aqueous phase carrying the diamine salt will be produced. The relatively diamine-free organic amine phase is then separated and neutralized with a base, preferably sodium hydroxide, in order to spring any dissolved amine salt and remove any dissolved mineral acid. Separation of the resulting organic phase yields the relatively pure sec.-alkyl primary monoamine. If desired, the diamine-containing aqueous phase may be neutralized to form a diamine concentrate which can be subsequently recovered.

The following example will further illustrate the embodiments of this invention.

Example I

This example typifies the novel extraction process of this invention.

A primarily $C_{14-15}$ amine stock (containing small quantities of $C_{13}$ and $C_{16}$ components) and derived from the nitration and reduction of a $C_{14}$–$C_{15}$ paraffin charge containing small quantities of $C_{13}$ and $C_{16}$ components was temperature, with 0.3% aqueous hydrochloric acid solution containing 5%, by weight of NaCl at an acid dosage of 0.1 equivalent per equivalent of base in the original amine charge; (2) neutralization of the treated amines from step (1) and then extraction at room temperature with 0.6% aqueous hydrochloric acid solution containing about 9% by weight of NaCl at an acid dosage of about 0.2 equivalent per equivalent of base in the original amine charge; (3) washing of the amine from step (2) with a 5% NaCl brine at room temperature; (4) extraction of the amine from step (3) at room temperature, with 1.5% aqueous hydrochloric acid solution containing 5% by weight of NaCl at an acid dosage of about 0.1 equivalent per equivalent of base in the original amine charge; (5) washing of the amine from step (4) with a 5% NaCl brine at room temperature and then at 140° F.

After neutralization, the recovered monoamine phase from step 5, a sample of monoamine phase from step 3, and materials extracted from both initial extractions (step 1) were submitted to gas chromatographic analysis. The results are presented in the following table which lists the amine concentration according to paraffin chain length and comparable mono- and diamine fractions of the blend. In the chromatographic analysis used to follow the process, the $C_n$ monoamines and the $C_{n-2}$ diamines are eluted together and therefore, their yields are not identified individually.

| Major amine components | | Percent | | | | |
| --- | --- | --- | --- | --- | --- | --- |
| Monoamines | Diamines | Charge | Final product | Monoamine from Step 3 | First extract | Second extract |
| $C_{13}$ | | 3.8 | 3.7 | 3.9 | Present | Present |
| $C_{14}$ | | 59.5 | 63.8 | 62.9 | 2.9 | 1.3 |
| $C_{15}+$ | $C_{13}$ | 26.7 | 28.0 | 27.5 | 6.4 | 3.0 |
| $C_{16}+$ | $C_{14}$ | 8.1 | 4.2 | 5.0 | 76.4 | 71.3 |
| | $C_{15}$ | 1.9 | 0.2 | 0.8 | 13.7 | 22.7 |
| | $C_{16}$ | Present | | Present | 0.6 | 1.8 |
| Nitrogen/carbon ratio | | 0.085 | 0.080 | | 0.158 | 0.185 |

The calculated overall yield of final product is about 90 mol percent of the charge.

The data summarized above clearly reveals the effectiveness of the novel process of this invention as evidenced by the substantially reduced diamine content in the extracted product as compared with the charge stock. It is further to be noted that the material extracted during the initial extractions consisted primarily of diamine range components.

Example II

A mixture of $C_{14-15}$ amine stock, derived as in Example 1, is treated to remove non-amine components and is extracted at 209–214° F. with 0.7% by weight aqueous hydrochloric acid solution at an acid dosage of 0.05 equivalent of base in the original charge. The treated amines are water-washed and dried, and the aqueous acid extract neutralized to recover an organic phase amounting to about 2% by weight of the original charge. Gas chromatographic (GC) analyses on a polar chromatographic column [1] indicated a substantial reduction of the diamine components in the treated product as compared to the diamine concentration in the original charge. Further GC also showed that the extracted material consisted almost entirely of diamine components. A yield of more than 80% of the final product is obtained.

Example III

A mixture of $C_{10-14}$ amine stock is treated to remove non-amine components and is extracted at 207–215° F. with 0.9% by weight of aqueous hydrochloric acid solution at acid dosages of 0.02 to 0.10 equivalent per equivalent of base contained in the original charge. The treated amines are neutralized, water washed and dried. The aqueous extracts are neutralizer yielding an organic phase amounting to about 0.8% to 6.0% by weight of the original charge. Gas chromatographic analysis on a polar chromatographic column (similar to that employed in Example II) indicated a reduction of diamine content in the treated products as compared to the diamine content contained in the original charge. In addition, the GC analysis indicated that the extracted material in all cases contained a large proportion of diamine components. Overall yields of final products are comparable to those obtained in the first two examples.

Summarizing, it is thus seen that this invention provides an effective process for extracting diamine by-products from sec.-alkyl primary monoamines.

Variations may be made in proportions, procedures and materials without departing from the scope of this invention as defined by the following claims.

What is claimed is:

1. A process for purifying secondary alkyl primary monoamines by extracting the diamine impurities therefrom which comprises contacting said monoamine-diamine blend with an aqueous mineral acid containing up to 10% by weight of a salt having an anion common to the mineral acid in amounts sufficient to extract said diamine impurities, separating said monoamine phase from said diamine-containing aqueous phase, neutralizing said monoamine phase with an aqueous alkaline solution, separating the monoamine phase from said resulting aqueous phase, and recovering a secondary alkyl primary monoamine product having a substantially higher monoamine content than the initial amine composition.

2. The process of claim 1 wherein said mineral acid is hydrochloric acid.

3. The process of claim 1 wherein an inorganic chloride salt is dissolved in said aqueous hydrochloric acid.

4. The process of claim 1 wherein said diamine-containing aqueous phase is neutralized to produce a diamine concentrate.

References Cited
UNITED STATES PATENTS 3,417,141   12/1968   Feldman et al. ___ 260—583 N X
3,470,250    9/1969   Patterson et al. _____ 260—583 M
3,492,354    1/1970   Cywinski _____ 260—583 N LEWIS GOTTS, Primary Examiner R. L. RAYMOND, Assistant Examiner U.S. Cl. X.R.

260—583 R, 583 M

---
[1] Ten percent carbowax 20 M poly(ethylene glycol) +0.2% KOH on a chromosorb P (calcined firebrick) support.

PO-1050
(5/69)

UNITED STATES PATENT OFFICE
CERTIFICATE OF CORRECTION

Patent No. 3,763,239           Dated October 2, 1973

Inventor(s)   WILLIAM SMOLIN

It is certified that error appears in the above-identified patent and that said Letters Patent are hereby corrected as shown below:

Column 2, line 45    After "was" insert --treated as follows: (1) two successive extractions, at room--

Column 3, line 29    After "equivalent" insert --per equivalent--

Signed and sealed this 26th day of March 1974.

(SEAL)
Attest:

EDWARD M. FLETCHER, JR.             C. MARSHALL DANN
Attesting Officer                   Commissioner of Patents